United States Patent [19]

Nadir et al.

[11] Patent Number: 5,737,569
[45] Date of Patent: Apr. 7, 1998

[54] MULTIPORT HIGH SPEED MEMORY HAVING CONTENTION ARBITRATION CAPABILITY WITHOUT STANDBY DELAY

[75] Inventors: James Nadir; Ching-Hua Chu, both of San Jose, Calif.

[73] Assignee: Intel Corporation, Santa Clara, Calif.

[21] Appl. No.: 622,614

[22] Filed: Mar. 26, 1996

Related U.S. Application Data

[63] Continuation of Ser. No. 85,983, Jun. 30, 1993, abandoned.

[51] Int. Cl.[6] .......................... G06F 12/00; G06F 13/14
[52] U.S. Cl. .................... 395/476; 364/DIG. 1; 364/DIG. 2; 364/238.4; 364/244.8; 395/477; 395/478; 395/481; 395/494; 395/495
[58] Field of Search ................ 364/DIG. 1, DIG. 2, 364/464.342, 238.4; 395/474, 475, 476, 477, 478, 479, 481, 494, 495

[56] References Cited

U.S. PATENT DOCUMENTS

| | | | |
|---|---|---|---|
| 4,535,428 | 8/1985 | Furman | 365/230 |
| 4,843,542 | 6/1989 | Dashiell et al. | 395/425 |
| 5,036,491 | 7/1991 | Yamaguchi | 365/189.07 |
| 5,089,992 | 2/1992 | Shinohara | 365/51 |
| 5,177,706 | 1/1993 | Shinohara et al. | 365/189.04 |
| 5,265,235 | 11/1993 | Sindhu et al. | 395/425 |
| 5,276,842 | 1/1994 | Sugita | 395/425 |
| 5,327,570 | 7/1994 | Foster et al. | 395/800 |
| 5,384,734 | 1/1995 | Tsujihashi et al. | 365/189.04 |
| 5,420,984 | 5/1995 | Good et al. | 395/275 |
| 5,502,683 | 3/1996 | Marchioro | 365/230.05 |

*Primary Examiner*—Tod R. Swann
*Assistant Examiner*—Tuan V. Thai
*Attorney, Agent, or Firm*—Blakely, Sokoloff, Taylor & Zafman

[57] ABSTRACT

An arbitration circuit and method for a multiport high speed memory in a computer microprocessor. A plurality of addresses are provided to a plurality of ports. The addresses are decoded in a plurality of decoders. The decoded output lines are compared in a comparison circuitry to determine if one or more of the ports is requesting access to the same memory line, and a comparison bit indicative of a match is outputted. If asserted, the comparison bit disables a line driver so that only one of the wordlines in a particular memory line is driven at any one time.

2 Claims, 13 Drawing Sheets

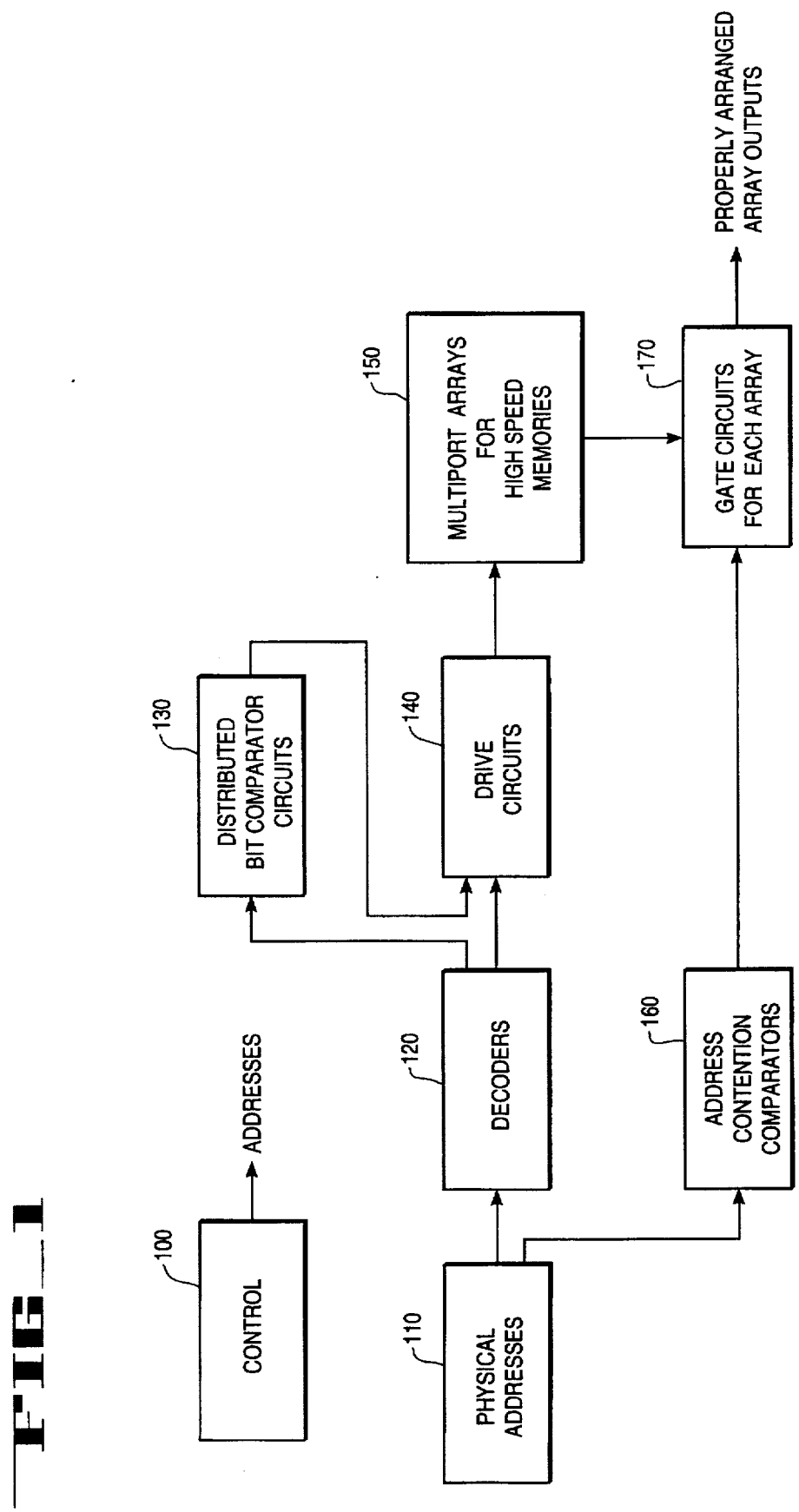

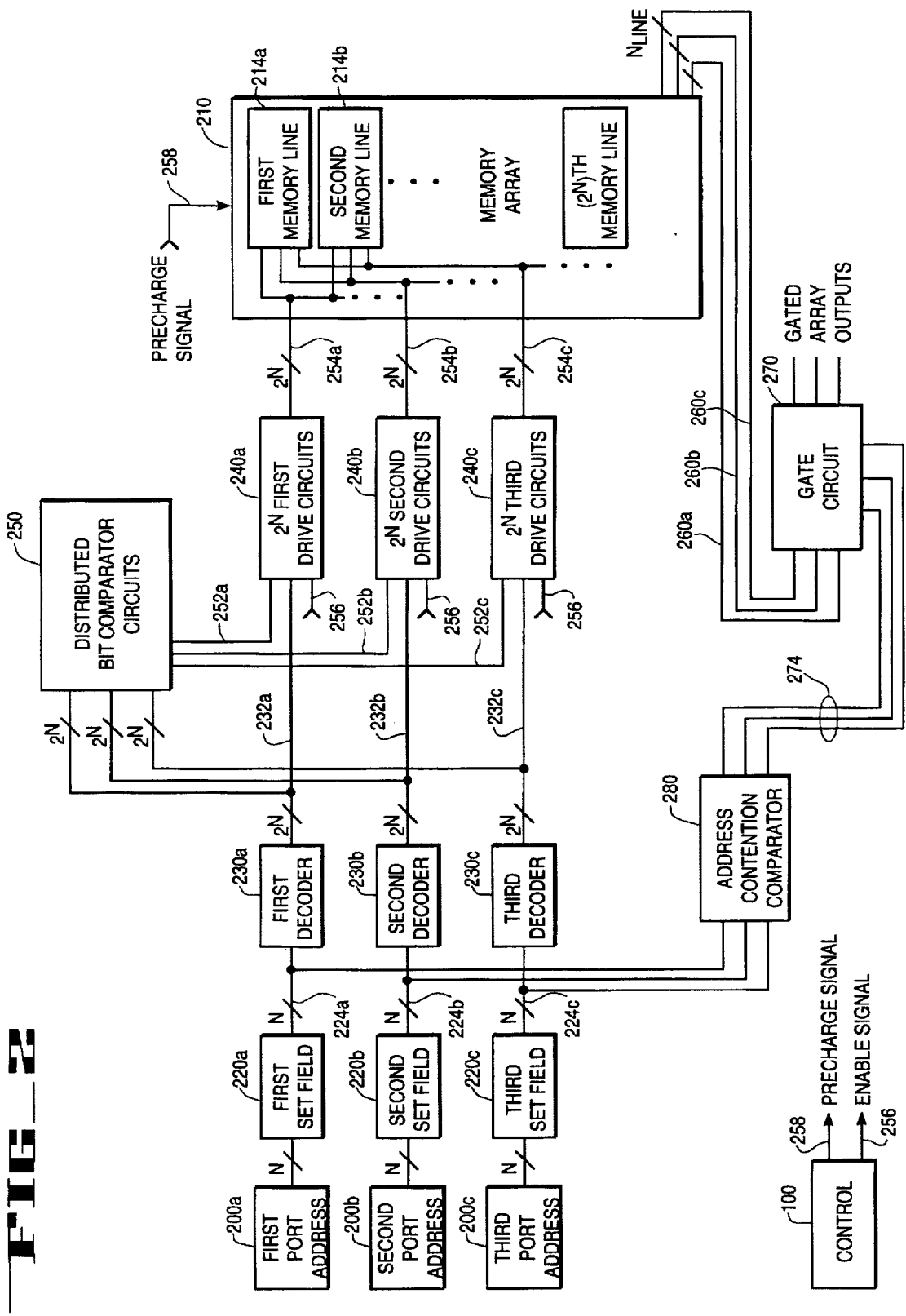

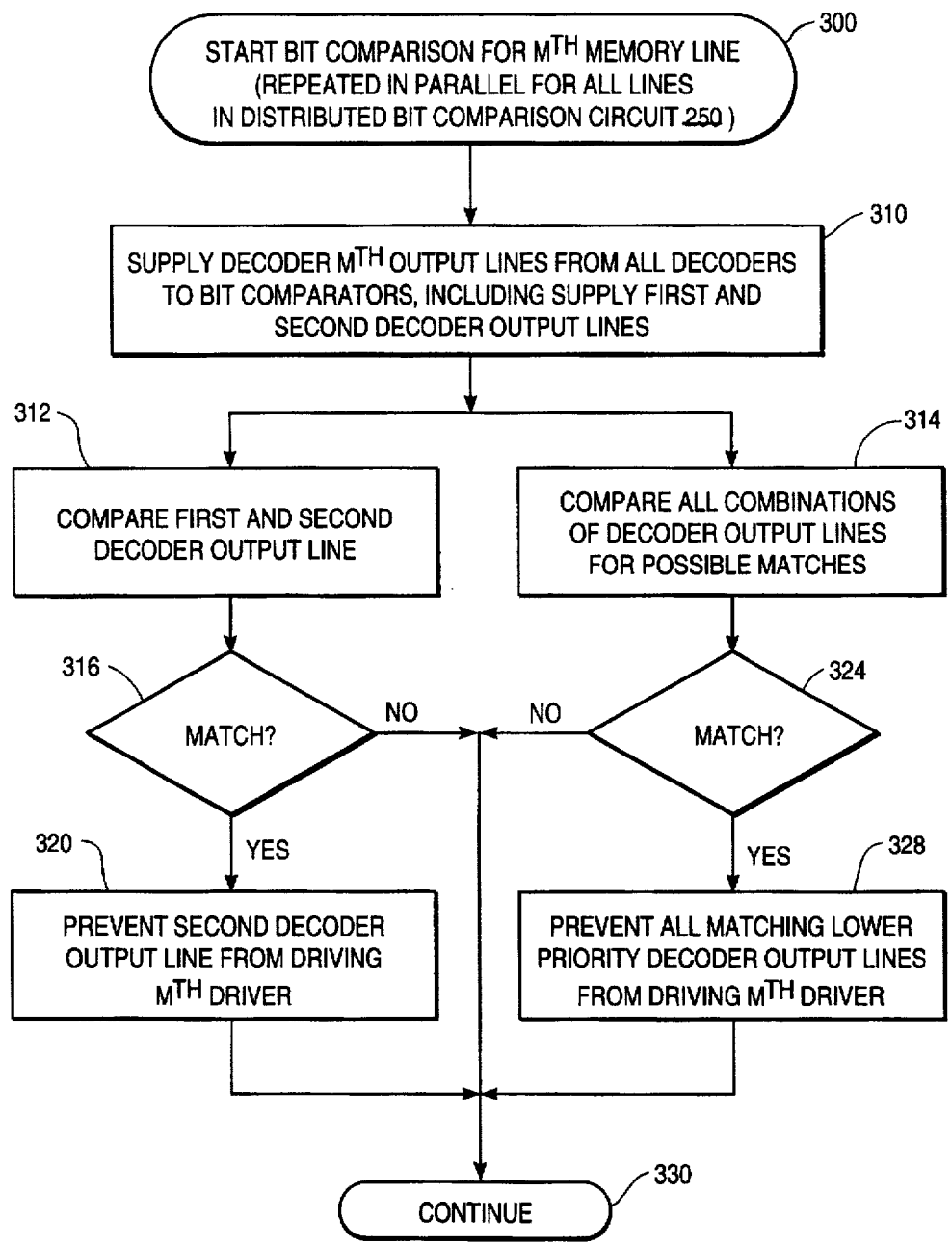
FIG_3

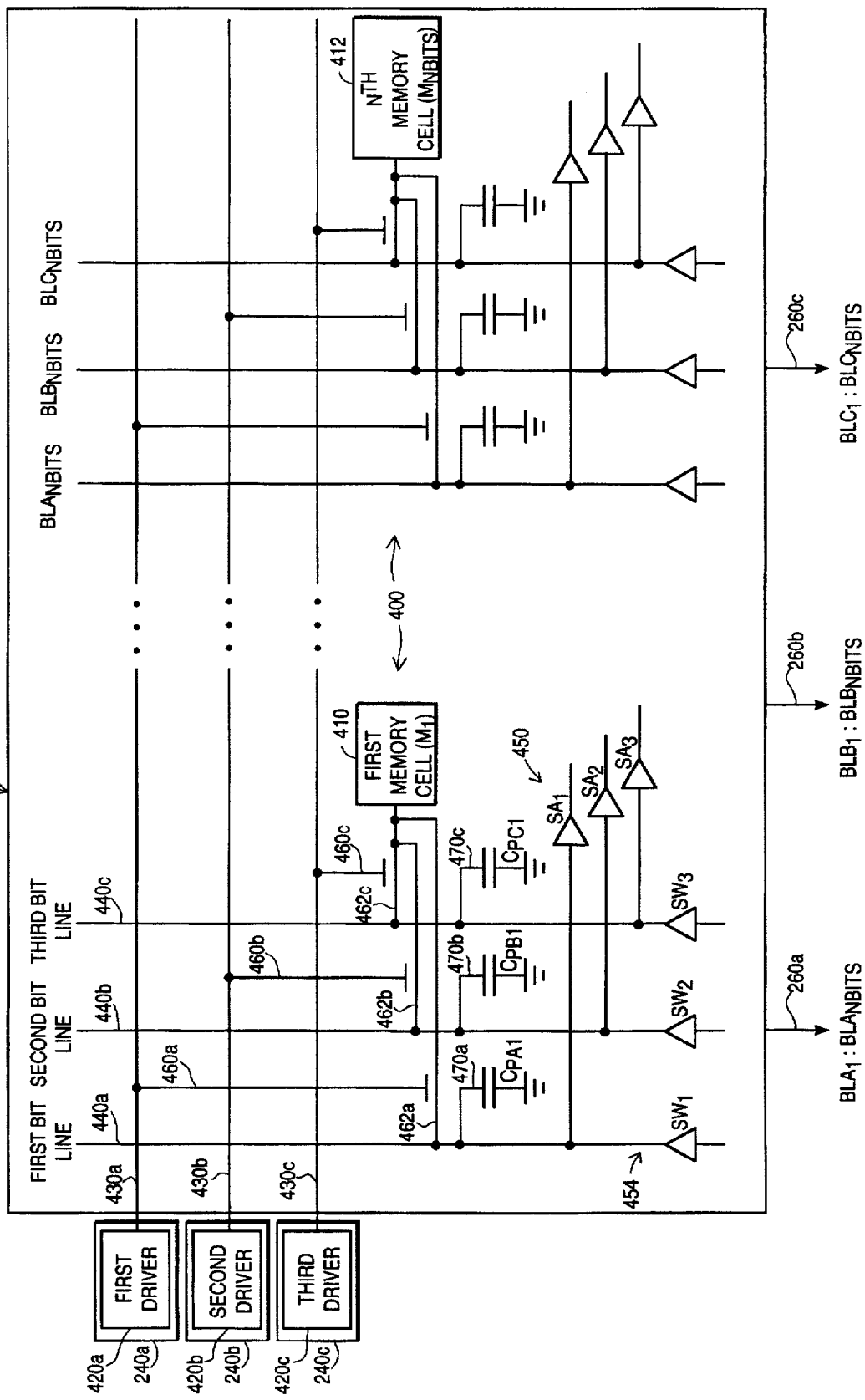

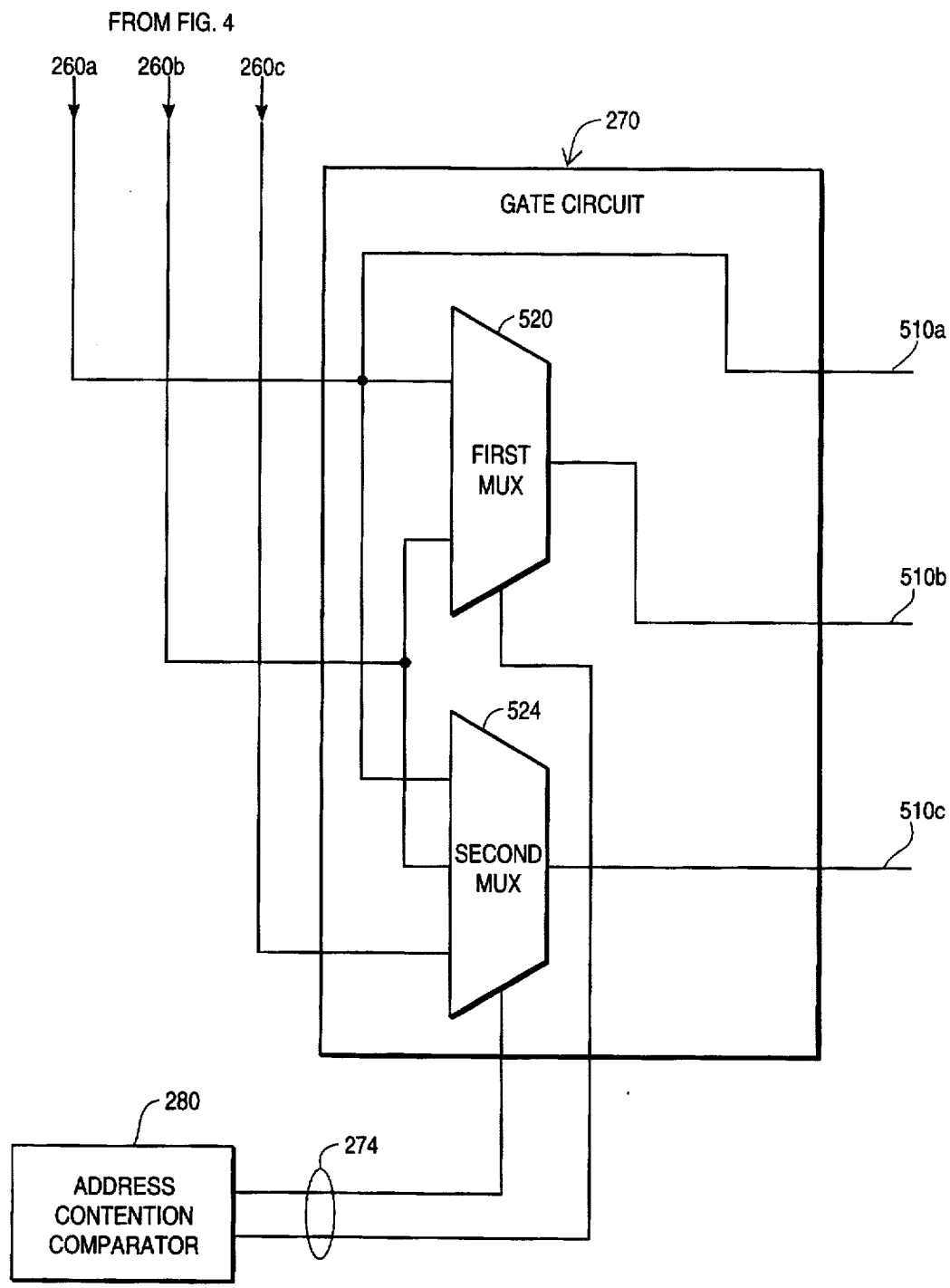

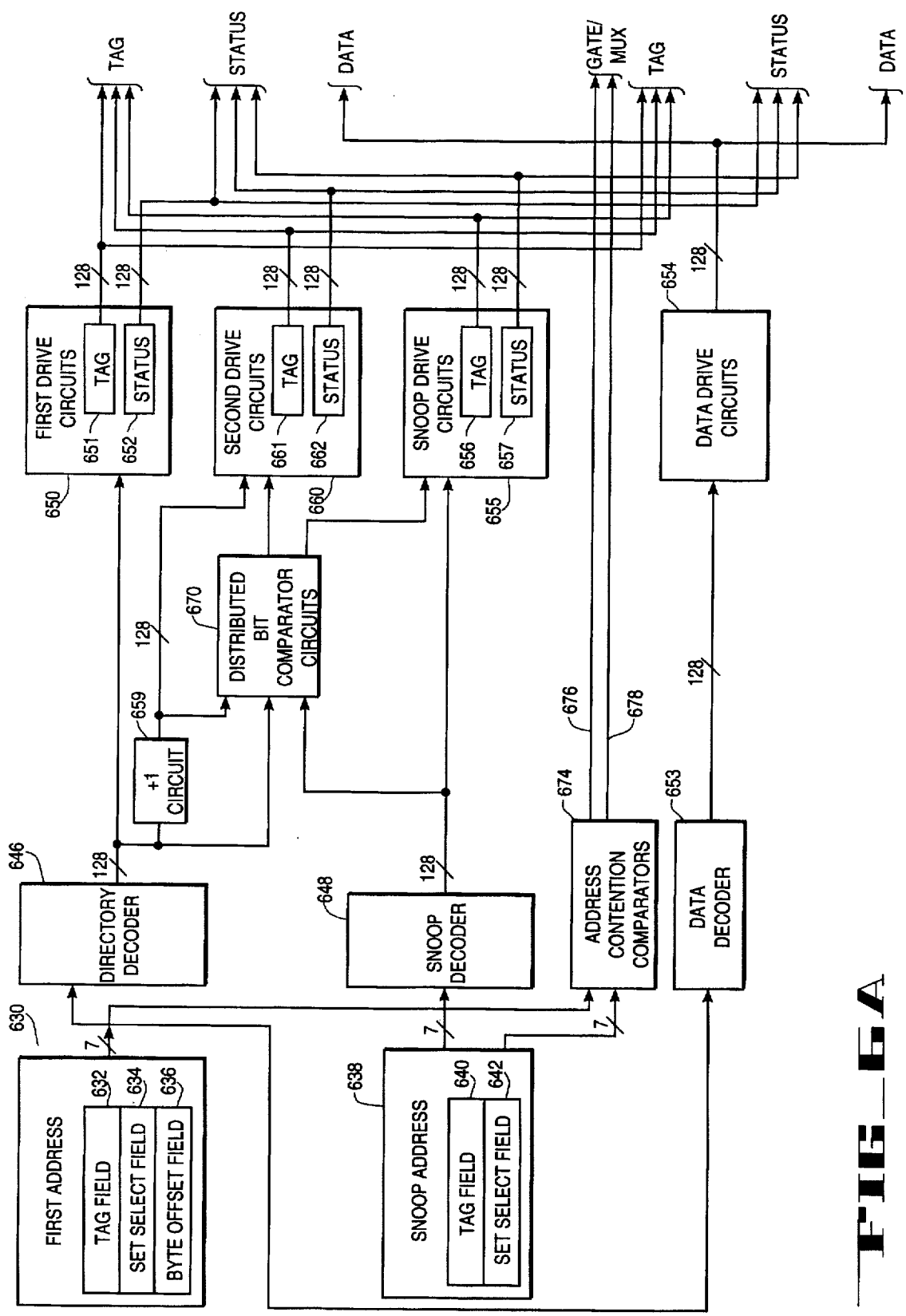
FIG_6A

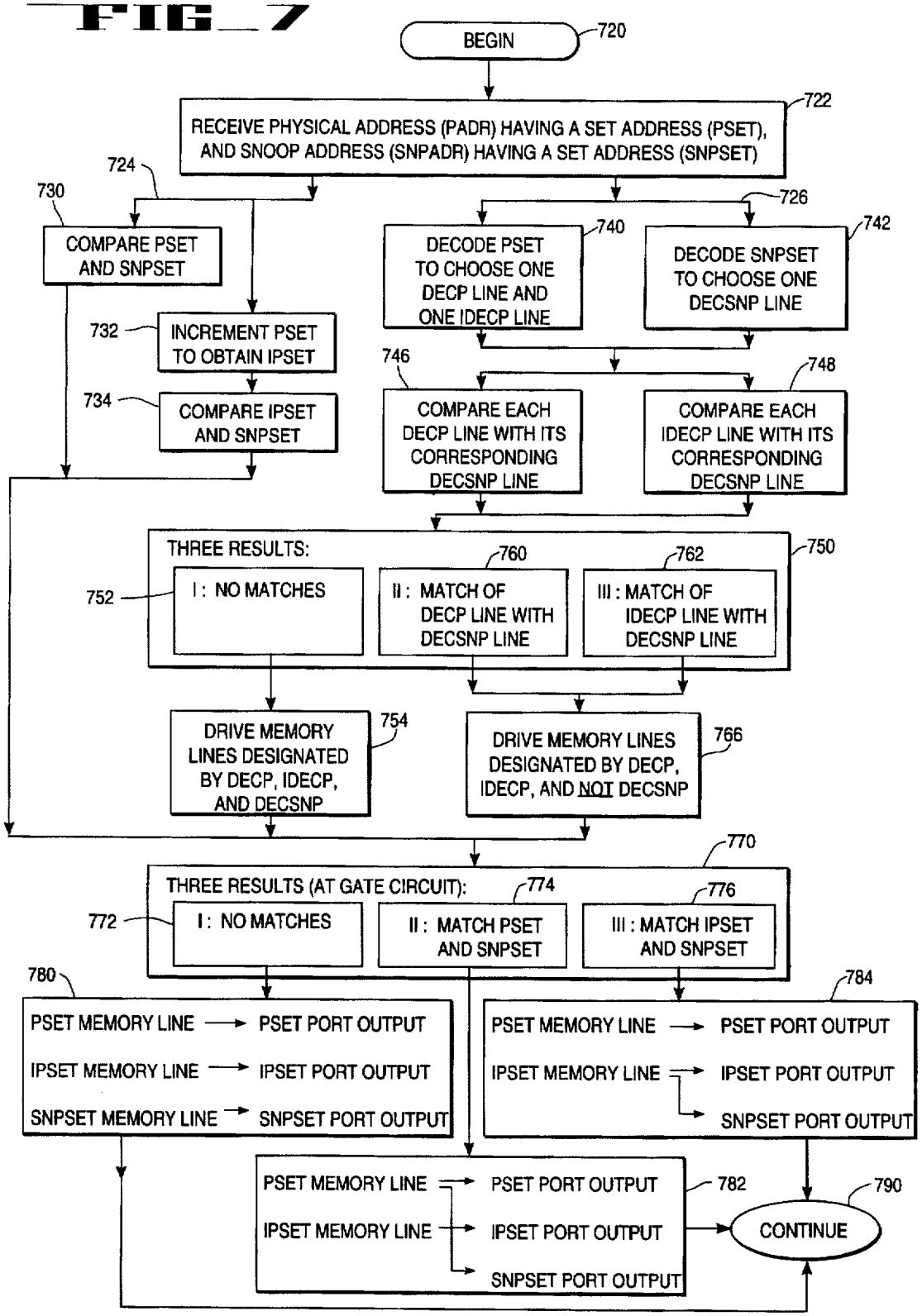

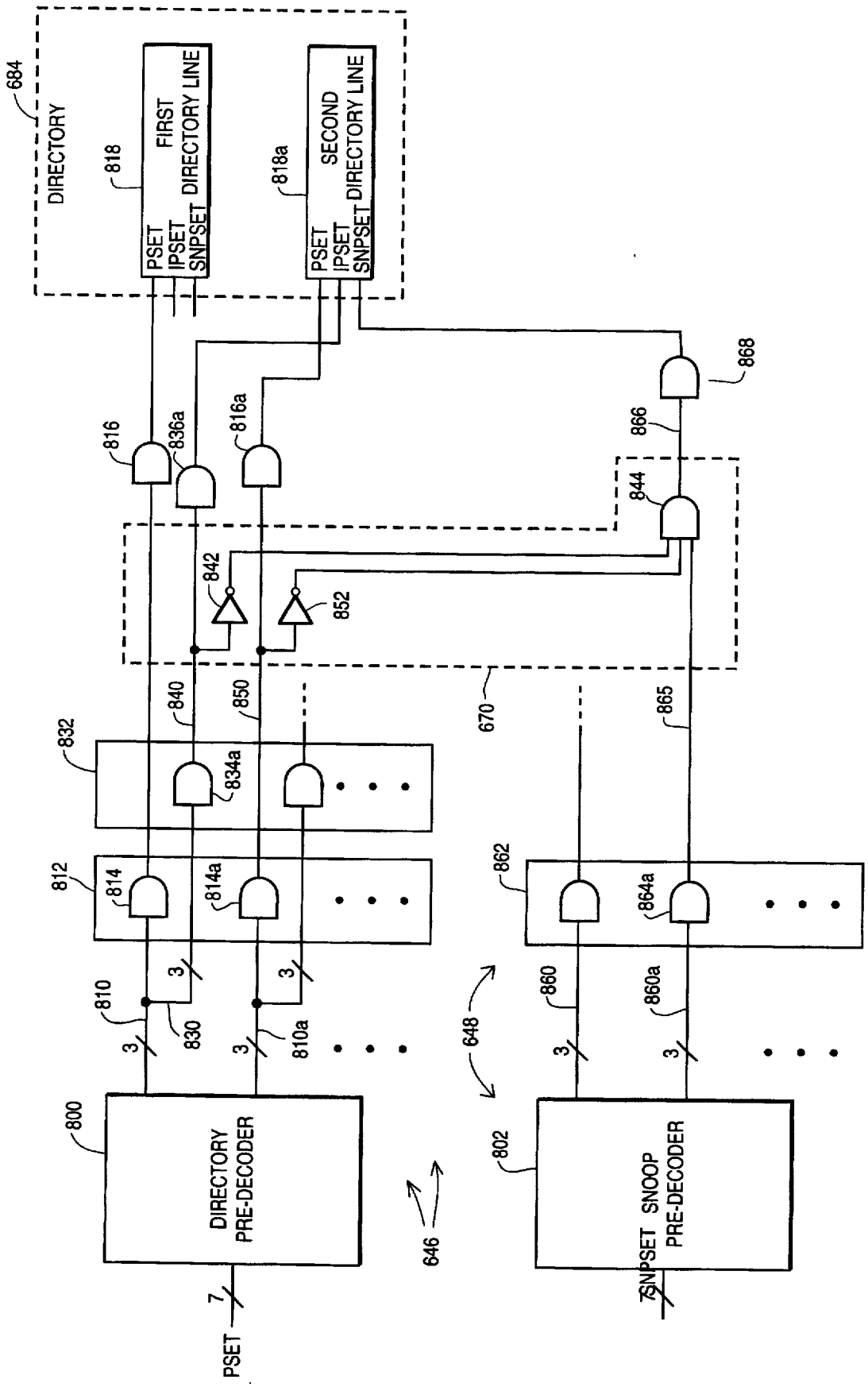

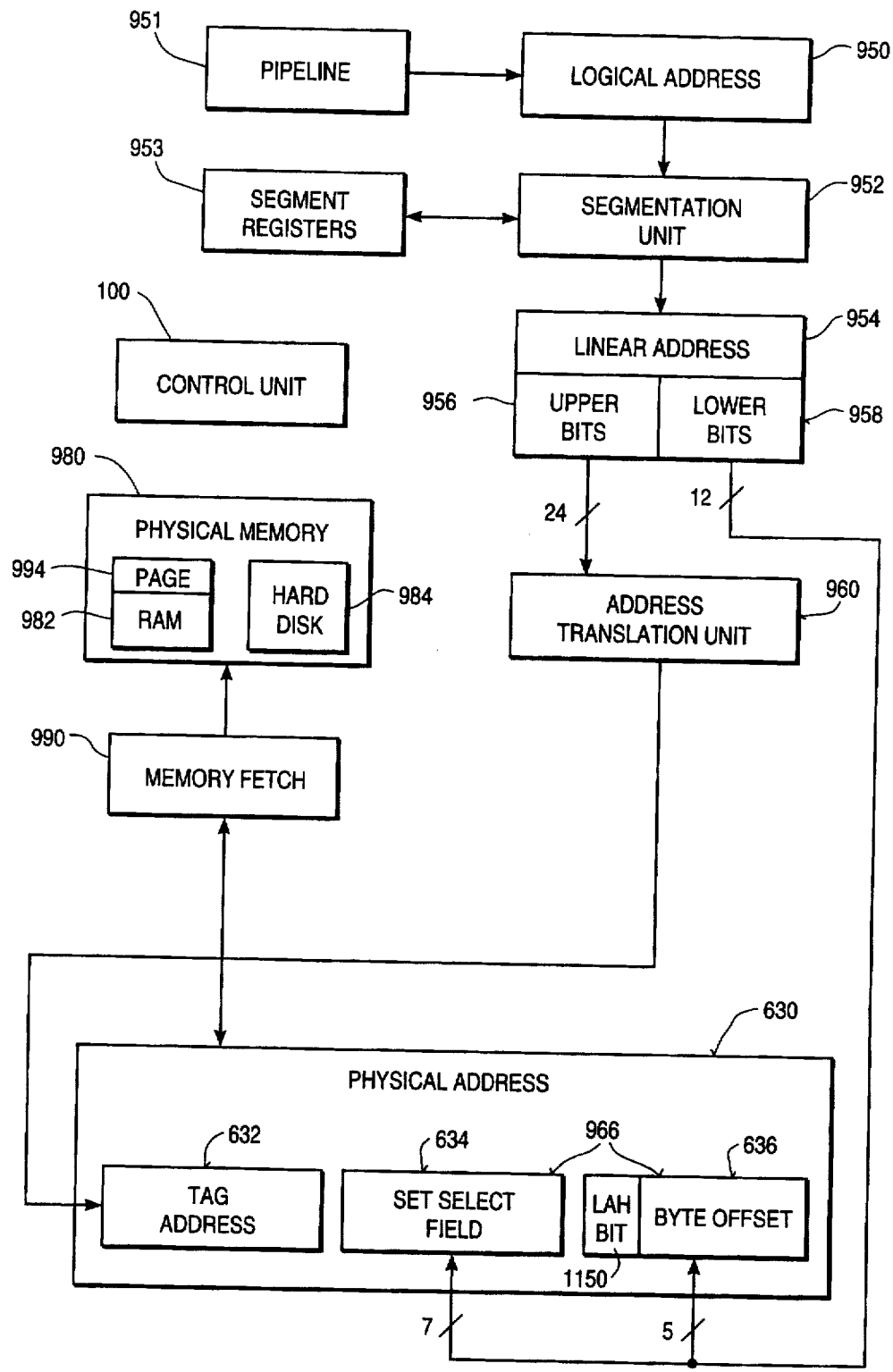
FIG_9

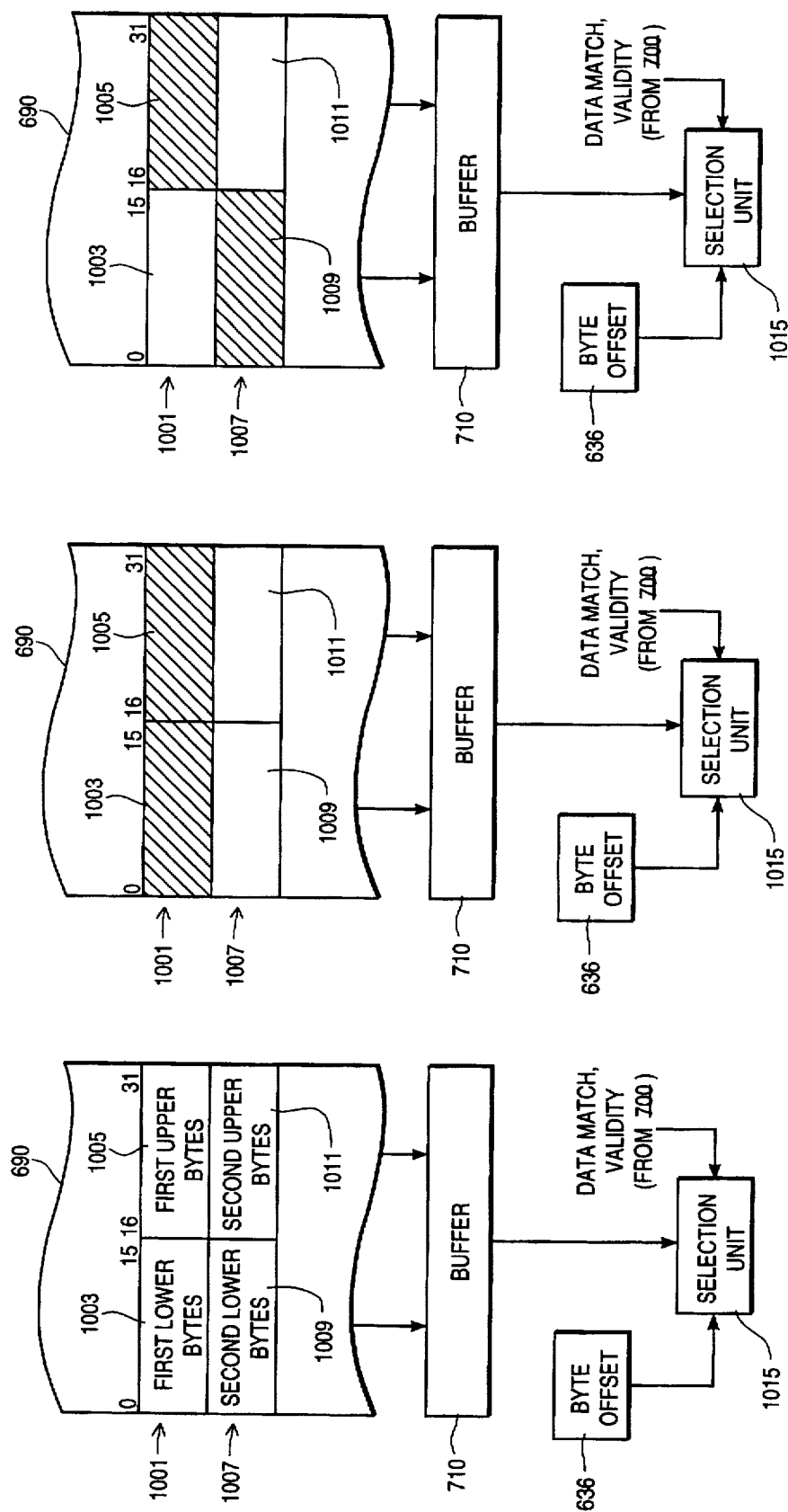

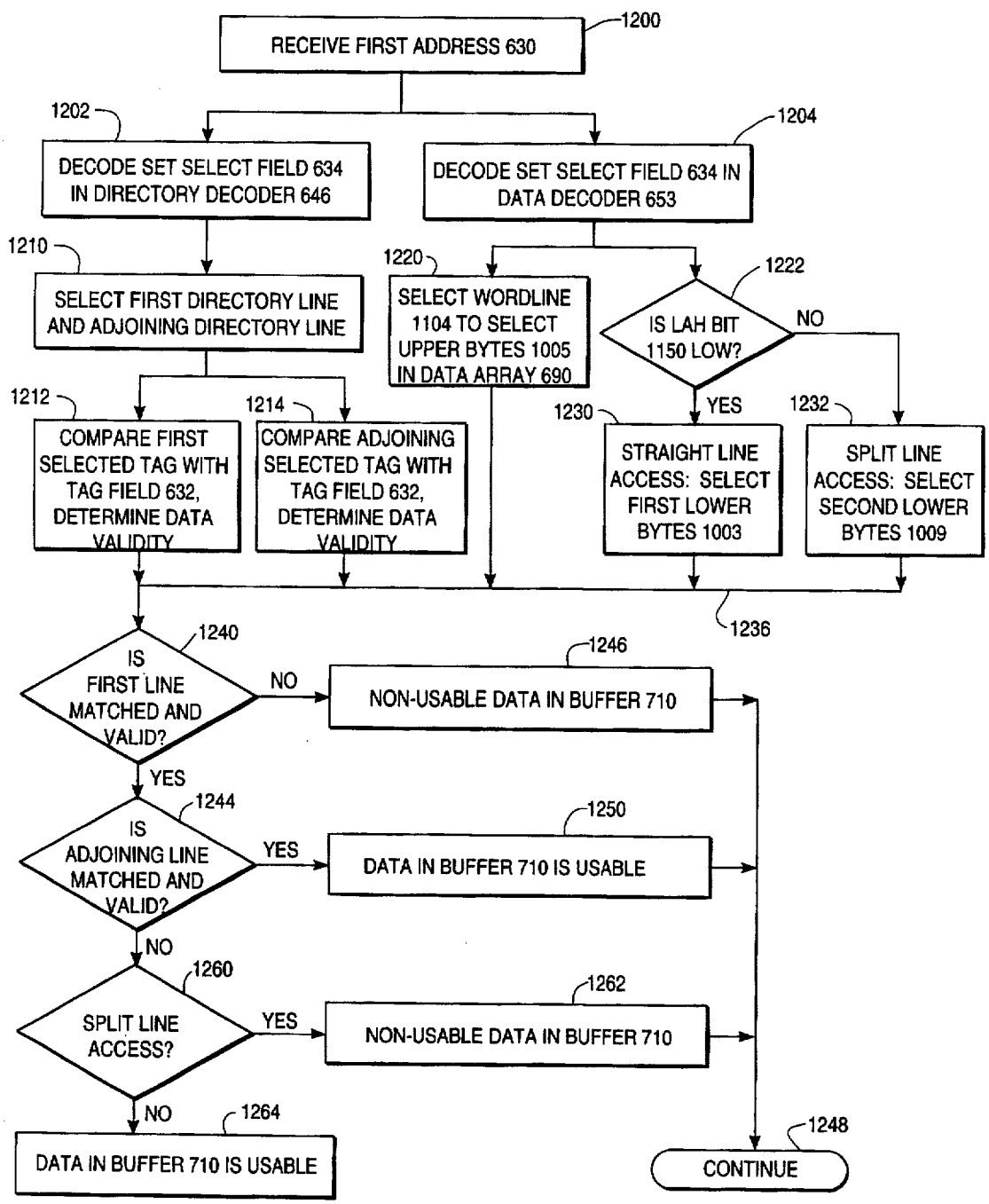
FIG_12

MULTIPORT HIGH SPEED MEMORY HAVING CONTENTION ARBITRATION CAPABILITY WITHOUT STANDBY DELAY

This is a continuation of application Ser. No. 08/085,983, filed Jun. 20, 1993, now abandoned.

Cross-reference is made to the following copending commonly assigned patent application, Ser. No. 087,637 filed Jun. 30, 1993, entitled "Apparatus and Method for Accessing a Split Line in a High Speed Cache", now U.S. Pat. No. 5,414,824 and Ser. No. 07/914,877 entitled "Multiple Port Cache" filed Jul. 16, 1992, pending which is incorporated by reference herein.

BACKGROUND OF THE INVENTION

1. Field of the Invention

The present invention relates to high speed computer memories, such as caches, with multiple ports. More specifically, the present invention relates to high speed arbitration for handling contention between two or more ports of a multiport high speed computer memory element.

2. Description of Related Art

Computer performance can be improved by reducing the average number of clock cycles necessary to perform memory accesses. In many processors, two or more cycles are required to access main memory. In order to reduce the average number of cycles to access memory, high speed memories can be utilized. One example of a high speed memory is a "cache". Caches improve performance by storing and supplying frequently used instructions and data in one or two clock cycles rather than the two or more cycles generally required for a memory access. Effective use of a cache can result in substantial performance improvements, which is why many microprocessors now include one or more caches in their architecture.

Caches are organized in "lines". A cache may include hundreds of cache lines, each line including a selected block of memory which may be many bytes in length. There are many types of caches. In a fully associative cache, data can be stored in any cache line, regardless of its address. In a set associative cache, the cache lines are organized into "sets". Each set is assigned to hold data that has common lower address bits (the set address), and the cache lines in a particular set can hold data only if the lower bits match the set address. Because the set address uses the lower bits (but usually not the lowest bits) of an address, a long block of data can be stored in a series of sets. This is advantageous because data is usually read or written sequentially from a large block of memory.

Further performance improvements can be obtained by allowing multiple simultaneous accesses to a single cache. A cache that can perform such a function is termed a "multiport" cache. In a multiport cache, each port can receive an address. Each address is decoded, the selected cache lines are accessed in parallel, and an output is supplied for each port substantially simultaneously.

The parallel access provided by a multiport cache can be useful to allow snooping the cache at the same time as another operation, such as a read, is occurring. Snooping can be useful in many ways. For example, if data has been modified in main memory by another microprocessor, a cache could be snooped to determine if it has the previous (unmodified) data stored therein. If so, the data can be marked invalid to avoid use of inaccurate data.

One problem with a multiport cache, which is also a problem with any multiport memory element, is "contention". When two or more of the ports desire access to a cache line at any one particular time, they are said to be "in contention" for that line. For example, if two ports, for example port A and port B, both receive the same set address, then both ports desire access to the same line of memory and the ports are in contention. The contention problem is further complicated by the independence of each port to read and/or write. For example, both ports A and B may try to read at the same time, or both ports A and B and may try to write at the same time. Furthermore, one of the ports may try to write while the other port tries to read.

Memory cells for multiport memories are usually configured in a memory array defined by a plurality of rows and columns. The rows of the array define memory lines. Each memory line can be selected by multiple word wordlines (one word wordline for each port). A plurality of bit lines (one for each port) extend along each column of the array, to provide the bit outputs from the memory cells selected by the word wordlines. Thus, for a two-port memory having a port A and a port B, the inputs to each memory line are provided on a word wordline A and a word wordline B, and the outputs from the cells in the memory line are provided on a plurality of bit lines A and bit lines B equal to the number of memory cells in a memory line. If ports A and B both select the same word wordline, then each memory cell on the line will drive both bit lines A and B simultaneously. As a result, the memory cell will be loaded down and memory will be slowed substantially—possibly by a factor of two or more. Therefore, it is advantageous to prevent multiple accesses to the same memory cell, i.e., to prevent multiple ports from selecting the same memory line.

Previous solutions to multiport contention include the use of an address comparator coupled to receive all the input addresses. The address comparator compares all the addresses, and outputs one or more signals indicative of whether or not the addresses match. One problem with an address comparator is the delay associated with performing the comparison. The length of this delay requires high speed memory elements to wait until contention has been determined, because the existence of a contention problem must be known with certainty before a memory access to an array has begun. One solution to this problem is to proceed operations with only one of the contending ports, while the others sit by idly, waiting until the address comparator provides the results of the contention comparison. That solution disadvantageously wastes time.

It would be an advantage to provide a multiport, high speed memory element that detects contention if it occur, without the delay associated with an address contention comparator. It would be an advantage if this multiport high speed memory element could supply an output on all of its ports within a short clock cycle. Such a multiport high speed memory element would be particularly useful for high speed caches in computer processors, because a quicker cache access time can greatly improve performance of the processor.

SUMMARY OF THE INVENTION

The present invention provides a high speed, multiport memory for a computer processor and a method for contention arbitration between the multiple ports. The contention arbitration is distributed; i.e., arbitration is performed for each bit. Only a bit level comparison is necessary to perform arbitration, and therefore, arbitration consumes very little time.

The multiport high speed memory circuit includes a plurality of ports, and a physical address means for providing a physical address to each of said plurality of ports. The address designates one of a plurality of memory lines in a memory array for storing computer data. Each memory line is defined by a plurality of memory cells. In each line, the cells are coupled together by a plurality of wordlines, including a separate wordline for each port. The multiport memory circuit includes a plurality of decoders, including a decoder for each port. Each of the decoders includes a circuit for decoding the physical address received by the port to which it is connected in order to select one of the plurality of decoder output lines. A plurality of line drivers are coupled to the memory array to drive a preselected wordline. Each line driver is coupled to receive inputs including one of the plurality of decoded wordlines. The multiport memory circuit also includes a plurality of distributed bit comparators coupled to the decoders, each bit comparator being coupled to receive the decoder output lines associated with a single memory line from at least two of the decoders. In response to the comparison, the distributed bit comparators output a comparison bit that controls a line driver, by, for example, disabling the driver if the comparison bit is "high".

The multiport memory circuit also includes an address comparator circuit coupled to the physical address means for comparing each of the physical addresses to determine if there is a match between any of two said addresses, and in response thereto to provide a plurality of gate control signals. Furthermore, the circuit includes a gate circuit coupled to receive each of the memory lines selected in the memory array by the drive circuits. The gate circuits are also coupled to receive the gate control signals in response thereto to gate memory lines to the port output line appropriate to the port that addressed the memory line.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and therefore resort to the claims is necessary to determine the inventive subject matter.

BRIEF DESCRIPTION OF THE DRAWINGS

FIG. 1 is a block diagram of a multiport high speed memory including bit comparator circuits, address contention comparator circuits and gate circuits.

FIG. 2 is a diagrammatic illustration of a multiport high speed memory circuit for a single memory array.

FIG. 3 is a flow chart of a bit contention comparison method according to the present invention.

FIG. 4 is a circuit diagram of the memory cells for one wordline in a three-port memory array.

FIG. 5 is a diagram of gate circuits for the three-port memory illustrated in FIG. 4.

FIG. 6A is a block diagram of a first portion of the multiport cache circuits of the preferred embodiment.

FIG. 7 is a flow chart of operation of the multiport cache contention system of the preferred embodiment.

FIG. 8 is a block diagram of circuits of the preferred embodiment, including pre-decoders, decoders, and comparison circuits.

FIG. 9 is a block diagram of an addressing system for providing a physical address.

FIG. 10A is a diagram of two 32-byte cache lines in a core for storing data, each of the cache lines being divided into an upper portion and a lower portion.

FIG. 10B is a diagram illustrating a straight line access.

FIG. 10C is a diagram illustrating a straight line cache access.

FIG. 12 is a flow chart of operations to perform a cache access that may be either a split line access or a straight line access.

DETAILED DESCRIPTION OF THE PREFERRED EMBODIMENT

Figure 6B:
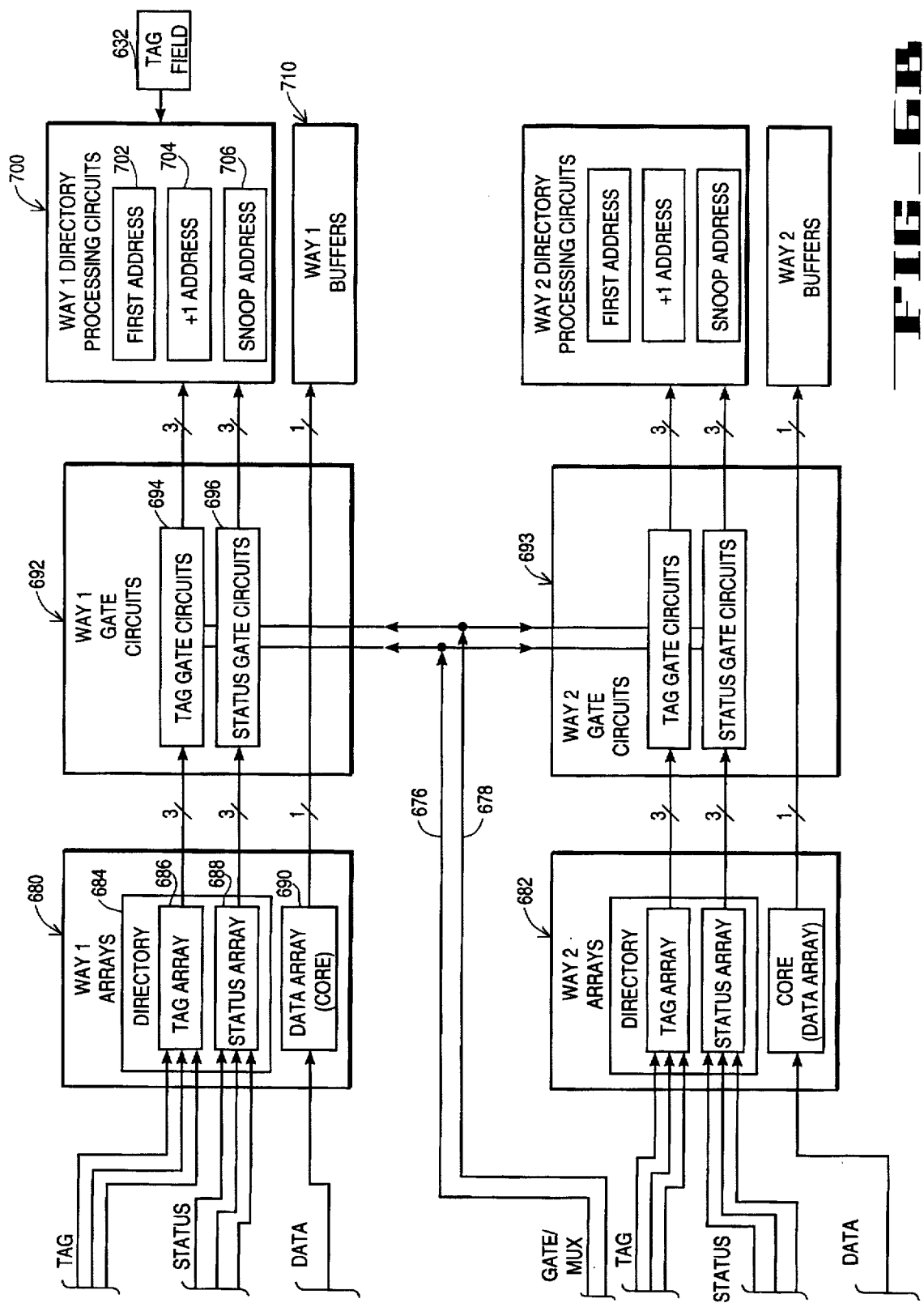
FIG. 6B is a block diagram of a second portion of the multiport cache circuits of the preferred embodiment.

FIGS. 1 through 12 of the drawings disclose various embodiments of the present invention for purposes of illustration only. One skilled in the art will readily recognize from the following discussion that alternative embodiments of the structures and methods illustrated herein may be employed without departing from the principles of the invention. In order to avoid unnecessarily obscuring the invention, circuits and other apparatus repeated in large numbers may be described with reference to a single circuit or apparatus, and methods repeated in large numbers may be described with reference to a single method.

Reference is first made to FIG. 1 which is a block diagram of a multiport high speed memory circuit. A control unit 100 controls operations including memory fetch, generation of multiple physical addresses, and other control functions for operating the memory circuit. Multiple physical addresses are illustrated in a box 110 and each of these addresses may include a plurality of fields. Each address is generated by the control unit 100 or an equivalent mechanism. The number of addresses should not exceed the number of ports; however, there may be fewer addresses than ports. The preferred method of generating addresses is described later in more detail with reference to FIG. 9.

Each address is supplied to one decoder in a plurality of decoders 120. The line outputs of the decoders 120 are individually supplied to bit comparator circuits 130 which will be described in more detail, and also to drive circuits 140, which drive the selected lines in one or more multiport arrays 150 that comprise one or more conventional high speed memory arrays. As will be described, the outputs from the multiport arrays 150 can be rearranged.

Each of the physical addresses 110 are supplied to address contention comparators 160 which compare those addresses that can be in contention. The address contention comparators 160 supply a control output to gate circuits 170. The lines which are directly output from the arrays 150 are also supplied to the gate circuits 170, from which they are rearranged in response to the control signal from the contention comparators 160. Thus, properly arranged multiport array outputs are supplied from the gate circuits 170.

Reference is now made to FIG. 2, which is a block diagram of a multiport high speed memory system for accessing three addresses including a first address 200a, a second address 200b, and a third address 200c. The addresses 200a–c are stored in any suitable means, for example latches. Each of the addresses 200a–c is a separate physical address that designates data in a 3-port memory array 210.

The high speed memory 3-port array 210 is organized into a plurality of memory lines including a first memory line 214a and a second memory line 214b. Each memory line includes three wordlines, one for each of the three ports. Each memory line 214a and 214b has a fixed length for storing data in digital form. There may be $2^N$ memory lines 214. If the memory array 210 has $2^N$ lines, then an address with "N" bits is necessary to uniquely designate each line. Each of the addresses received in the ports 200a–c may include multiple fields, one of which is a set field having "N" bits. Particularly, the first address 200a supplies a first set field 220a that designates a first memory line, the second address 200b supplies a second set field 220b that designates a second memory line, and the third address 200c supplies a third set field 220c that designates a third memory line.

The first set field 220a is supplied on a first set bus 224a to a first decoder 230a which outputs first decoder output lines 232a. Likewise, a second set field 220b is supplied on a set bus 224b to a second decoder 230b which outputs second decoder output lines 232b, and the third set field 220c is supplied on a third set bus 224c to a third decoder 230c which outputs third decoder output lines 232c. Each of the decoders 230a–c include conventional circuits to decode the N bits of the set fields 220a–c into a maximum of $2^N$ outputs. In other words, the set field 220a is decoded in the first decoder 230a to select only one of its $2^N$ first decoder output lines 232a; likewise, the second and third set fields 220b and 230c are decoded respectively in the second and third decoders 230b and 230c to select only one of their respective $2^N$ output lines 232b and 232c.

The first decoder output lines 232a are respectively supplied to $2^N$ first drive circuits 240a, the second decoder outputs 232b are respectively supplied to $2^N$ second drive circuits 240b, and the third decoder outputs 232c are respectively supplied to $2^N$ third drive circuits 240c. The decoder outputs 232a, 232b, and 232c are also supplied to distributed bit comparator circuits 250. The distributed bit comparator circuits 250 receive all decoder outputs 232a, 232b, and 232c and perform comparisons appropriate to determine if the same memory line has been selected by two or more ports 200. In a general example of comparisons performed in the comparator circuits 250, port two is compared with port one, and port three is compared with port one and port two. Depending upon the implementation, other comparisons may be required. The bit comparator circuits 250 are described in more detail elsewhere, particularly with reference to the flow chart of FIG. 3. Briefly the distributed bit comparator circuits 250 compare the decoder output lines 232a, 232b, 232c, and in response thereto, comparison bits 252a, 252b, 250c are respectively output to each of the drive circuits 240a–c. In response to the decoder output lines 232a, 232b, and 232c, comparison bits 252a, 252b and 252c from the distributed bit comparator circuits 250 are supplied respectively to each of the drive circuits 240a–c, in accordance with the results of the bit comparison. In the preferred embodiment, the comparison bits 252a are not necessary, and therefore the first drive circuits 240a would not be affected by the bit comparisons.

The drive circuits 240a–c each include a circuit to drive a selected wordline in the plurality of memory lines 214a and 214b in the memory array 210. Specifically, the first drive circuits 240a are supplied to the memory array 210 on a first wordline bus 254a that includes a separate wordline for each memory line 214. Likewise, the second drive circuits 240b are supplied to the memory array 210 on a second wordline bus 254b that includes a separate wordline for each memory line 214, and the third drive circuits 240c are supplied to the memory array 210 on a third wordline bus 254c that includes a separate wordline for each memory line 214. The drive circuits 240a–c are responsive to the decoder output lines 232a–c, comparison bits 252a–c (as appropriate), and an enable signal 256 provided by the control unit 100. However, before the enable signal is utilized to enable the drive circuits 240a–c, a precharge signal 258 is applied to the memory array 210 in order to precharge all bit lines. The precharging is useful for increasing the speed of memory access. Specifically, precharging the lines advantageously allows the driver circuits 240a–c to quickly drive any particular line 214, thereby allowing faster memory line access.

After a selected memory line has been driven, direct array outputs including first bitlines 260a, second bitlines 260b, and third bitlines 260c are provided from the memory array 210 to a gate circuit 270. Gate control signals 274 are supplied to the gate circuit 270 from an address contention comparator 280 which receives each of the first set field 220a, the second set field 220b, and the third set field 220c, and performs comparisons between all sets that can possibly match. Based upon the results of the comparisons, and the relative priority accorded to the ports by the distributed bit comparator circuits 250 in the event of a contention, the gate circuits 270 are controlled by the gate control signals 274 to route or reroute the bitline outputs 260a–c for proper arrangement.

Reference is now made to FIG. 3 which is a flowchart of operations in the distributed bit comparator circuits 250 of FIG. 2. In order to avoid unnecessarily obscuring the invention, the bit comparison for only one of the $2^N$ memory lines, termed the "$M^{th}$" memory line is described herein. It should be apparent that the bit comparisons are repeated in parallel for each of the $2^N$ memory lines. Circuit implementation of the flow chart described in FIG. 3 is within the capabilities of one skilled in the art. For example, a simple logic gate may suffice for some implementations. The implementation for the preferred embodiment is described elsewhere.

Beginning in a box 300, the bit comparison is started for an arbitrary (the $M^{th}$) memory line in the array 210. Within the distributed bit comparator circuits 250, the following operations occur in parallel for each of the memory lines. For example, if there are $2^N$ memory lines, then the operations are performed in $2^N$ parallel operations.

In a box 310, the decoder output lines 232a, 232b, and 232c for the $M^{th}$ memory line, including a first decoder output line and a second decoder output line, are supplied to the distributed bit comparators 250. If there are three decoders, then three decoder output lines will be supplied to a bit comparator circuit for the $M^{th}$ memory line. These decoder output lines are compared as illustrated in boxes 312 and 314. In a box 312, the first and second decoder output lines are compared. If there are only two decoder output lines that can possibly be in contention, then only the box 312 will be executed. If there are more than two decoder output lines that can be in contention, then a box 314 illustrates the additional comparisons necessary to determine whether or not these decoder output lines are in contention. In the box 314, all other possible combinations for matching the $M^{th}$ memory line are compared, and therefore it should be apparent that more than one operation may be required in the box 314. In a decision box 316, if the first and second decoder $M^{th}$ output line match, then the second decoder output line (having a lower priority) is prevented from driving the $M^{th}$ driver as illustrated in a box 320. Priority is predetermined by the circuit; in the event of a contention, the highest priority decoder line will win. It should be noted that the second decoder output line is assumed to have a lower priority than the first decoder output line for purposes of illustration. In any particular embodiment, assignment of priority is arbitrary, but must be taken into account at the gate circuits where the direct array outputs are gated.

In a decision box 324, if a match is detected for any of the possible combinations, then all lower priority matching decoder output lines are prevented from driving the $M^{th}$ driver, as illustrated in a box 328. However, if there are no matches determined in either the box 316 or the box 324, then operation continues as illustrated in a box 330. FIG. 7, described elsewhere in detail, is a flow chart that describes contention arbitration for the full system of the preferred embodiment.

Reference is now made to FIG. 4 which is a circuit diagram of an illustrative memory line 400 for a three-port memory such as the 3-port memory array 210. The memory line 400 includes a plurality of memory cells including a first memory cell 410 and an $N^{th}$ memory cell 412 that each hold a single bit of memory. The memory line 400 defines a word with the bits stored therein. All memory cells in the line 400 are coupled to wordlines 430a–c. A plurality of additional memory cells represented by ". . ." are positioned between the two memory cells 410 and 412. For convenience in explanation, only circuits associated with the first memory cell 410 will be described. The circuits are repeated for the other memory cells.

In FIG. 4, a first driver 420a is included in the $2^N$ first drive circuits 240a. A second driver 420b is included within the $2^N$ second drive circuits 240b. A third driver 420c is included within the $2^N$ third drive circuits 240c. (The drive circuits 240a–c are shown in FIG. 2.) Referring still to FIG. 4, the first driver 420a is connected to a first wordline 430a, the second driver 420b is connected to a second wordline 430b, and the third driver 420c is connected to a third wordline 430c. A plurality of bit lines, including a first bit line 440a, a second bit line 440b, and a third bit line 440c are coupled to supply an output through read sense amplifiers 450. The bit lines 440a, 440b, and 440c can also be used to write a value to the first memory cell 410 through write circuitry illustrated generally at 454.

Operations related to selecting the line 400 follow. If, for example, the first driver 420a selects the first word wordline 430a, then a first control line 460a energizes a switch line 462a that connects the first memory cell 410 with the first bit line 440a. Similarly, the second word wordline 430b is connected to a second control line 460b which controls a switch line 462b to connect the second bit line 440b with the memory cell 410. The third word wordline 430c is connected similarly to a control line 460c and a switch line 462c. If any of these wordlines 430a–c is energized, then that line connects the memory 410 with the respective bit line 440a–c. A parasitic capacitance is illustrated at 470a–c. By the contention circuit described above with reference to FIG. 3, the bit lines 440a–c are prevented from becoming simultaneously energized. A problem with the prior art is that, if the first memory cell 410 were to be energized with two of the bit lines, for example if 440a and 440b were to be energized, then the capacitance 470a and 470b substantially slows simultaneous energizing of both bit lines 440a and 440b.

All bit outputs from the memory array 210 are conventionally combined together as illustrated to provide the direct array bitline outputs 260a–c. Specifically, the first bit lines for all memory cells in the array 210 are combined at the bitline output 260a, the second bit lines for all memory cells in the array 210 are combined at the bitline output 260b, and all the third bit lines for all memory cells in the array 210 are combined at the bitline output 260c.

Reference is now made to FIG. 5 which is a circuit diagram of the gate circuit 270 (FIG. 2) that receives three direct bitline outputs 260a, 260b, and 260c supplied from the memory array 210 of FIG. 4. The following example assumes that, in the event of contention, A has priority over B, and B has priority over C. It should be apparent that any arbitrary priority order could be implemented in accordance with the principles of the gate circuit 270 to be described. The gate circuit 270 supplies an output for each port: a first gate output 510a for the first port, a second gate output 510b for the second port, and a third gate output 510c for the third port. The first direct output 260a, having the highest priority, is applied through the gate circuit 270 to directly supply a gate output 510a. The first direct output 260a is also supplied to a first multiplexer 520 and a second multiplexer 524. The second direct output 260b is supplied to the first multiplexer 520 and the second multiplexer 524. The output of the first multiplexer 520 supplies the gate output line 510b. Control for the first multiplexer 520 is supplied from the address contention comparator 280 on the plurality of lines 274. Specifically, the first and the second addresses are compared, and if they are the same, then the first multiplexer 520 selects the first direct output 260a. However, if there is no contention, then the second direct output 260b is supplied to be the second gate output 510b from the first multiplexer 520.

The second multiplexer 524 provides the third gate output 510c from the gate circuit 270. The first direct output 260a, the second direct output 260b, and the third direct output 260c are all input into the second multiplexer 524. If the third address matches the first address, then it will be selected in the second multiplexer 524. However, if the third address matches the second address but not the first address, then the second address will be selected to be the third gate output 510c. Finally, if the third address matches neither the first address nor the second address, then the third direct output 260c is the third gate output 510c.

It may be noticed that the distributed comparator circuits 250 compare the decoder output signals, while the contention comparator 280 compares the addresses directly. In some embodiments, the gate control signals 274 supplied by the contention comparator 280 could be supplied directly from the distributed bit comparator circuits; however, implementation of that system would likely be impractical and costly because it would require a very large (and slow) combinational logic element to bring together the memory comparison bits to provide the results of the comparison to the gate circuit 270. Therefore, in the preferred embodiment, the address contention comparator 280 is provided to compare the addresses in parallel with decoding addresses and selecting memory lines. Although the address contention comparator 280 consumes time while performing this comparison, the results of the comparison will be available at or before the time when the direct bitline outputs 260a–c are eventually supplied from the memory array 210. Therefore, use of the separate contention comparator 280 does not introduce additional delay.

Reference is now made to FIGS. 6A and 6B. The preferred embodiment includes a two-way set associative cache that has 128 sets for storing data blocks. In the two way set associative cache, each set has two cache lines, one for each data block. However, it should be apparent that the contention arbitration mechanism can be used in any N-way set associative cache and also can be used in any multiport high speed memory.

For purposes of the following description, the term "data" will be used in its usual sense to include any binary representation, including instructions. When a cache line is to be stored, the data is first mapped onto a set, and then the data is placed in a block within the set. In the preferred embodiment, the two-way set associative cache defines a block of data (the "data field") as 32 bytes. Data at a given memory address can be stored in only one of the 128 cache sets, but that data may be stored in either of the two "ways" that is preselected by a control unit.

A first physical address is illustrated in a box 630. Generation of the first address, which is a physical address in the preferred embodiment, is described later in more detail with reference to FIG. 9. The first physical address 630 is divided into a plurality of fields including a tag address field 632, a set select field 634, and a byte offset field 636. The tag address field 632 stores a tag address indicative of the upper bits of the physical address, the set select field 634 stores set select data indicative of a set in the cache, and the byte offset field 636 stores a byte offset indicative of the byte number at which to begin reading data to be offset in the cache line. Particularly, the preferred embodiment stores thirty-two bytes in a line, the set select field is 7 bits, and the byte offset field is five bits. Thus the set select field selects one of 128 sets, and the byte offset field is utilized to specify a particular byte at which to begin reading data to apply to the data output buffers. Data access is described in more detail with reference to FIGS. 10A-C, FIG. 11, and FIG. 12.

A snoop address 638 is also illustrated. The snoop address 638 includes a tag field 640 and a set select field 642. Unlike the first address 630, the snoop address 638 does not require a byte offset field because if the snoop address 638 does find an entry, then it invalidates that particular entry without reading the data.

The set select field 634 is applied to a directory decoder 646. In the preferred embodiment, 128 decoder output lines are provided from the decoder 646, and therefore the set select field includes seven lines (128=2$^7$). However, in other embodiments, the number of decoder output lines could be more or less than 128, and the number of bits in the set select field 634 would vary accordingly. The snoop address 638 is applied to a snoop decoder 648 which, like the decoder 646, receives seven bits from the set select field 642 and selects one of 128 output lines.

The decoder output lines from the directory decoder 646 are applied to first drive circuits 650 that drive wordlines in the directory 684 (FIG. 6B). The directory 684 includes a tag array 686 and a status array 688. The first drive circuits 650 include tag drive circuits 651 coupled to drive wordlines in the tag array 686, and status drive circuits 652 coupled to drive wordlines in the status array 688.

The first address 630 is also applied to a data decoder 653 that decodes the 7-bit set select field into 128 decoder output lines. The data decoder 653 may be similar in construction to the directory decoder 646. The decoder output lines from the data decoder 653 are applied to data drive circuits 654. The data drive circuits 654 are coupled to drive data wordlines in a data array (core) 690, as will be described in more detail with reference to FIG. 11.

Referring still to FIG. 6A, from the snoop decoder 648, the decoded lines are applied to snoop drive circuits 655, which drive wordlines in the directory 684 (FIG. 6B). The snoop drive circuits 655 include snoop tag drive circuits 656 that drive tag wordlines and snoop status drive circuits 657 that drive status wordlines. The snoop drive circuits 655 in the preferred embodiment do not include circuits to drive the data array 690 because, as implemented, if the snoop address does find an entry, then that entry is invalidated in the status array 688 without reading the data. If an entry is not found by a snoop operation, then no further operations are necessary.

The 128 decoder output lines from the directory decoder 646 are also applied to a "+1" circuit 659 which is useful for determining the validity of a second, adjacent sequentially following cache line during a split line access. The +1 circuit 659 selects a line next following the line selected in the directory decoder 646. This next line is applied to the second drive circuits 660, which include second tag drive circuits 661 for driving the wordlines in the tag array 686 and second status drive circuits 662 for driving the wordlines in the status array 688.

Distributed bit comparator circuits 670 receive the decoder output lines from the directory decoder 646, the +1 decoder output lines from the +1 circuit 659, and the snoop decoder lines from the snoop decoder 648. The distributed bit comparator circuits 670 operate in the manner described with reference to the flow chart of FIG. 3. In this embodiment, there are only two possible matching combinations: the directory decoder output line and the snoop decoder output line, and the +1 decoder output line and the snoop decoder output line. The other combination between the directory decoder output line and the +1 decoder output line is excluded because, by definition, the +1 circuit 659 has the physical address next following that of the directory decoder 646. The distributed bit comparator circuits 670 are implemented with the following priority: The first drive circuits 650 have priority over the snoop drive circuits 655 and the second drive circuits 660 have priority over the snoop drive circuits 655. Therefore, in the event of a contention, the first drive circuits 650 and the second drive circuits 660 will be enabled and not the snoop drive circuits 655.

The first physical address 630 and the snoop address 638 are also provided to address contention comparators 674. Within the address contention comparator 674, the relevant portion of the first physical address 630 (the tag field 632 and the set select field 634) is compared with the relevant portion of the snoop address 638 (the tag field 640 and the set select field 642). A second address comparison is made using the first physical address 630 incremented by one. In other words, the set select field 634 is increased by one and then a comparison is made with the snoop address 638. The outputs of the address contention comparators 674 are indicative of whether or not the two comparisons found a match. A first comparison output line 676 provides a signal indicative of a match between the first address 630 and the snoop address 638, and a second comparison line 678 provides an indication of the result of the comparison between the snoop address 638 and the incremented first address 630. The comparison output lines 676 and 678 are provided to gate circuits 692 and 693 shown in FIG. 6B.

Reference is now made to FIG. 6B. In the preferred embodiment, the high speed memory arrays are divided into two sets ("ways") of arrays: first way arrays 680 and second way arrays 682. The arrays 680 and 682 are preferably of a similar construction, and therefore only the first way array 680 will be described in detail. In the first way arrays 680, the arrays include a directory 684 including a tag array 686 and a status array 688. The first way arrays 680 also include a data array 690 which may also be termed a "core". The structure of the data array 690 includes features for split line accesses which will be discussed later in more detail with reference to FIG. 11.

A cache line is defined by a directory line in the directory 684 and an associated data line in the data array 690. A directory line is defined by a tag line in the tag array 686 and an associated status line in the status array 688. Although the directory 684 was implemented by separate arrays (the tag array 686 and the status array 688), in other embodiments the directory 684 could be implemented in a single array.

The directory 684 has three ports. Circuitry for a three-port cache is disclosed in a commonly assigned copending application Ser. No. 07/914,887, filed Jul. 16, 1992, entitled "Multiple Ported Cache", which is incorporated by reference herein.

The tag array 686 includes a plurality of tag lines, one for each of the cache lines. Each tag line is accessed by three wordlines: a first tag wordline coupled to one of first drive circuits 650, a second tag wordline coupled to one of the second drive circuits 660, and a snoop tag wordline coupled to one of the snoop drive circuits 655. The status array 688 includes a plurality of status lines, one for each of the cache lines. Each status line is accessed by three wordlines: a first status wordline coupled to one of the first drive circuits 650, a second status wordline coupled to one of the second drive circuits 660, and a snoop wordline coupled to one of the snoop drive circuits 655. Each status line field includes an LRU field, a parity field, and a valid field. "LRU" means "least recently used" and is used by the control unit 100 for determining which cache entry will be replaced on a write. A parity field specifies the parity of the tag lines. The valid field specifies whether or not a particular cache line is valid.

Separate gate circuits are provided for each way. For the first way arrays 680, first way gate circuits 692 are provided, and for the second way arrays 682, second way gate circuits 693 are provided. The first way gate circuits 692 include tag gate circuits 694 and status gate circuits 696. Like gate circuits are included in the second way gate circuits 693.

The direct bitline outputs of the tag array 686 and the status array 688 are applied to the first way gate circuits 692. Each array 686, 688, and 690 has three direct output lines of data (one for each of the three ports). The first way gate circuits 692 are utilized to rearrange the direct outputs in the event that a contention caused the distributor bit comparator circuits 670 to prevent the snoop drive circuit 655 from driving a line. Depending upon which of the addresses is in contention, the appropriate direct output line will be routed to the snoop output. For a discussion of the gate circuits, reference is made to the previous discussion regarding FIG. 5.

The preferred embodiment includes the cache circuitry described in commonly assigned, co-pending applications which are incorporated by reference herein. These applications, which are incorporated by reference herein, include Ser. No. 08/035,630, entitled "Method and Apparatus for Overlapped Timing of Cache Operations Including Reading and Writing with Parity Checking", filed on Mar. 23, 1993, and Ser. No. 08/035,740, entitled "A Circuit for Selecting a Set in a Set Associative Cache", filed on Mar. 23, 1993.

The output of the tag gate circuits 694 and the status gate circuits 696 are applied to first way cache directory processing circuits 700, which include separate directory processing circuits for each address, including the first address processing circuit 702, the +1 address processing circuit 704, and the snoop address processing circuit 706.

The output from the data gate circuit 698 is applied to first way buffers 710. Particularly, the three outputs from the data array 690 are supplied from the data gate 698 and applied to three separate buffers 710. Depending upon the results of the address processing circuits 700, one, two, or three of the data outputs in the buffers 710 will be utilized.

Reference is made to FIG. 7 which is a flow chart of operations of the multiport cache circuit of the preferred embodiment. Operation begins in a box 720. In a box 722, the circuit receives a first physical address, designated "PADR", and a snoop address, designated "SNPADR". The first physical address includes a set address designated "PSET" and the snoop address includes a set address designated "SNPSET". From the box 722, operation proceeds in parallel along two paths: a first path 724 in which the set addresses are compared in their entirety, and a second path 726 in which the set addresses are decoded and other operations are performed.

On the first path 724, the PSET and SNPSET addresses are compared in a box 730. In parallel, in a box 732, PSET is incremented to obtain IPSET, and in a box 734 the IPSET and SNPSET addresses are compared.

On the second path 726, operation proceeds in parallel to boxes 740 and 742. In the box 740, the PSET address is decoded to choose two decoder output lines. One of the lines chosen is a DECP line, which is a decoder output line from the first decoder 646 (FIG. 6A). The selected DECP line is utilized to select a IDECP line for the next sequential memory line following the memory line selected by the DECP line. The IDECP lines are useful for a split line access. Simultaneously with the box 740, in the box 742, the SNPSET address is decoded to choose one of the DECSNP lines which are the snoop decoder output lines from the snoop decoder 648 (FIG. 6A).

Operation then moves to a box 746 which is performed simultaneously with operations in a box 748. In the box 746, each of the DECP lines is compared with its corresponding DECSNP line. In the box 748, each of the IDECP lines is compared with its corresponding DECSNP line. The output of each comparison is a comparison bit or another signal that disables the snoop drive circuits 655 (FIG. 6A) if a match is found.

From the comparisons in the boxes 746 and 748, a box 750 illustrates three results from the comparisons. Within the box 750, a box 752 illustrates the first result in which there are no matches. From the box 752, the driver circuits 650, 660, and 655 (FIG. 6A) are allowed to respectively drive the memory lines specified by DECP, IDECP, and SNPSET. Returning to the box 750, a second result illustrated in a box 760 is a match between one of the DECP lines and the corresponding DECSNP lines. A third result, illustrated in a box 762, is a match between one of the IDECP lines and the corresponding DECSNP line. From the boxes 760 and 762, if a match is found in either the second or third result, then operation moves to the box 766 in which the drivers 650, 660 (FIG. 6A) drive the memory lines specified by DECP and IDECP, but the snoop drive circuits 655 (FIG. 6A) do not drive the memory line specified by the DECSNP line. All possible matches are illustrated in the box 750. It should be apparent to one skilled in the art that the preferred embodiment has a limited number of possible matches, because the DECP line cannot match the IDECP line, thereby allowing only two possible matches. Other embodiments (not shown) may have a different number of possible matches.

Following execution in the boxes 754 and 766, a maximum of three memory lines are available from the memory array. These three memory lines are the direct array outputs 260A, 260B, and 260C illustrated in FIG. 2. From the boxes 754 and 766, operation then combines at a box 770 with the comparisons from the boxes 730 and 734.

In the box 770 one of three results is supplied from the comparisons illustrated in the boxes 730 and 734. The three results from the boxes 730 and 734 supply the control inputs into the gate circuits 692 and 693 (FIG. 6B). These three results in the box 770 in the box 770 directly correspond to the three results illustrated in the box 750.

In a first box 772, there are no matches. In a second box 774, a second result is a match between SNPSET and PSET. A box 776 illustrates a third result which is a match between IPSET and SNPSET.

Under the first result in the box 772, there are no matches. In that event, all memory lines are applied directly through the gate circuits 692 and 693 (FIG. 6B) to supply the port outputs, as illustrated in a box 780. Under the second result in the box 774, if a match is found between PSET and SNPSET, then operation moves to the box 782 in which the PSET and IPSET memory lines are applied directly to supply the PSET and IPSET port outputs, and the PSET memory line is gated to supply the SNPSET port output. Finally, from the third result in the box 776, operation goes to a box 784 in which the PSET and IPSET memory lines are applied to supply the PSET and IPSET port outputs, and the IPSET memory line is gated to the SNPSET port output. Following the boxes 780, 782, and 784, operation continues as illustrated in a box 790.

Reference is now made to FIG. 8 which is a circuit diagram of pre-decoders, decoders, and comparison circuits for the directory 684 in the preferred embodiment. The 7-bit set address PSET is applied to the directory decoder 646 that includes a first pre-decoder 800. The first predecoder 800 includes conventional circuitry including two 2-to-4 decoders and a 3-to-7 decoder. The first predecoder 800 provides up to 128 sets of three lines including a first set 810a. Likewise, the 7-bit set address SNPSET is applied to a snoop pre-decoder 802 of similar construction to the first pre-decoder 800. The outputs of the directory pre-decoder 800 are applied to a first post-decoder 812 that includes a plurality of AND gates. Particularly, each of the 128 AND gates is coupled to one set of the output lines from the directory pre-decoder 800. Each of the 128 AND gates outputs a decoder output line coupled to a driver 816 that drives a PSET wordline in a directory line in the directory 684, which may be a line in the tag array 686 or the status array 688 or both. The directory lines 818 and 818a are each accessed by three wordlines: a PSET wordline, a IPSET wordline, and a SNPSET wordline. The first set 810 of decoder lines is supplied to an AND gate 814 in the first post-decoder 812. The output of the AND gate 814 is supplied to a first driver 816 that drives the PSET wordline in a first directory line 818 in the directory 684. Although not shown, the driver 816 also receives an enable signal as an input.

For a split line access, it is useful to determine if a second, adjoining directory line 818a includes valid data that matches the tag 632 in the first address 630. In order to simultaneously drive the second directory line 818a, a second set 830 of predecoded output lines is coupled to the first set 810 from the directory pre-decoder 800. This second set 830 is supplied to a second post-decoder 832 that, like the first post-decoder 812, includes a plurality of AND gates. For example, the second post-decoder 832 includes an AND gate 834a coupled to the second set 830. The output of the AND gate 834a is applied to a driver 836a that is coupled to drive an IPSET wordline in the second directory line 818a. Also coupled to the second directory line 818a is the output of a next set 810a from the directory decoder 800 which is coupled to an AND gate 814a in the first post-decoder 812. These circuits are repeated for all 128 sets in the directory 684.

The distributed bit comparator circuits 670 include a plurality of inverters and AND gates. In order to provide a comparison between the decoded PSET address and the decoded SNPSET address, the output of the AND gate 834a on the line 840 is coupled to the input of an inverter 842 which is coupled to an AND comparison gate 844. Furthermore, the output of the AND gate 814a on the line 850 is coupled to an inverter 852 which is supplied to the AND comparison gate 844.

The snoop pre-decoder 802 supplies a first pre-decoded line set 860 and a second pre-decoded line set 860a to a snoop post-decoder 862 including a plurality of AND gates including an AND gate 864a coupled to the second set 860a. The output of the AND gate 864a is supplied on an output line 865 to the AND comparison gate 844. The output of the AND gate driver 844 is applied on the line 866 to an input of snoop driver 868. Although not shown, another input into the snoop driver 868 is an enable signal. The snoop driver 868 drives a SNPSET wordline in the second directory line 818a. Thus, the AND comparison gate 844 prevents the snoop decoder line 865 from driving the SNPSET wordline in the second directory line 818a if either of the corresponding decoder output lines 840 and 850 are energized. That is, if either the PSET wordline or the IPSET wordline are energized then the SNPSET wordline will not be energized. In the preferred embodiment, for increased speed each AND gate is implemented by a NAND gate followed by an inverter. An enable signal 256 (see FIG. 2) is coupled to an input in the drivers for timing purposes, and a precharge signal 258 (see FIG. 2) is coupled to the memory lines for precharging.

Reference is made to FIG. 9 which shows a circuit for generating the physical address in the implemented embodiment, which includes segmentation and paging. The described arrangement for generating the physical address is conventional in INTEL x86 microprocessors. A logical address 950 is supplied from a pipeline 951. The logical address 950 is the address used by a programmer, which allows the programmer to view memory as one sequential block. The logical address 950 is applied to a segmentation unit 952, which takes the logical address 950, applies values in segment registers 953, and outputs a linear address 954 which has twenty-four upper bits 956 and twelve lower bits 958.

In order to translate a linear address 954 into the physical address 630 (FIG. 6A), translation of the upper bits 956 of the linear address 954 occurs in an address translation trait 960. These translated upper bits become the tag address 632 of the physical address 630. Blocks of data are defined to be 4K bytes, therefore translation of the lower twelve bits 958 of the linear address 954 is unnecessary because they are identical with lower bits 966 of the physical address 630. Therefore, the lower twelve bits 958 can also be applied directly to the physical address 630 or to a memory fetch unit 990 as appropriate.

The address translation unit 960 includes tables and circuitry for locating the physical address 630 from a linear address 954 and may include a TLB (Translation Look-aside Buffer). An exemplary address translation arrangement is disclosed in U.S. patent application Ser. No. 07/832,944 by Donald B. Alpert et al., entitled "Physical Address Extension for a Microprocessor".

The physical memory 980 includes RAM (Random Access Memory) 982 and hard disk memory 984. Other types of memory may be used as well. In physical memory 980, data blocks are stored wherever convenient, and blocks having sequential linear addresses may physically be stored in any order. The physical address 630 directly corresponds to data location in the physical memory 980. In other words, the physical address 630 specifies the actual memory location in which the information is stored. The physical address 630 is applied to a memory fetch unit 990 that fetches data from physical memory 980. Conventionally, the RAM 982 is utilized to store information from the hard disk 984 before it is used by the processor. Thus, the memory fetch unit 990 first looks to the RAM 982 for data at a requested physical address. If data at that physical address is not in RAM 982, then a memory cycle is run to retrieve that data from the hard disk 984 and store it in RAM 982.

Split Line Access

The data array 690 (FIG. 6B) is designed to cache data from the physical memory 980. Blocks of data are termed "pages" in the physical memory 980. For example, a page 994 is illustrated in RAM 982. In the preferred embodiment each page includes 4K bytes of data, and the core 690 has a size to store a complete 4K page of sequential data. To uniquely designate each byte within a 4K page, there are twelve lower bits 966 in the physical address 630. The core 690 has 128 lines, each line being thirty-two bytes. Each line corresponds to a set, and therefore the 7-bit set select field 634 uniquely designates one of 128 sets, and the 5-bit byte offset field 636 uniquely designates one of the bytes within each 32-byte cache line.

Split line accesses are useful because the buffers 710 that receive data from the data array 690 can receive up to thirty-two bytes of data. FIGS. 10A–C illustrate a straight line access and a split line access. It will be assembled that memory in the data array 690 is structured sequentially from the top down; i.e. the addresses get progressively higher as one moves from the top to the bottom. Within each line, the lowest address is on the left (byte 0) and increases toward the right (toward byte 31).

Reference is first made to FIG. 10A which is a diagram that illustrates two data lines in the data array 690. A first data line 1001 includes thirty-two bytes numbered 0 through 31 that are divided into first lower bytes 1003 including bytes 0 through 15 and first upper bytes 1005 including bytes 16 through 31. Also illustrated in FIG. 10A is a second data line 1007 that includes second lower bytes 1009 including bytes 0–15 and second upper bytes 1011 including bytes 16–31.

Reference is now made to FIG. 10B which illustrates a straight line access. In FIG. 10B, all thirty-two bytes to be received by the buffer 710 are somewhere within the first line 1001. Therefore, all thirty-two bytes in the first line 1001 are shaded including the first lower bytes 1003 and the first upper bytes 1005. The shaded bytes are output from the core 960 to the 32-byte buffer 710. A selection unit 1015, including control logic receives the 32-byte buffer 710 and the 5-bit byte offset field 636, includes circuitry to select and store the sixteen bytes beginning at the byte position designated by the byte offset field 636. As will be described in more detail later with reference to FIG. 12, operations in the selection unit 1015 are contingent upon data validity and matching. Reference is now made to FIG. 10C which illustrates a split line access. In a split line access, the first upper bytes 1005 of the first data line 1001 and the lower bytes 1009 of the second data line 1007, which are shaded, are supplied from the one port output of the core 690. The output is supplied to the 32-byte buffer 710, and then to the selection unit 1015 which can select and store the sixteen bytes designated by the byte offset field 636.

Figure 11:
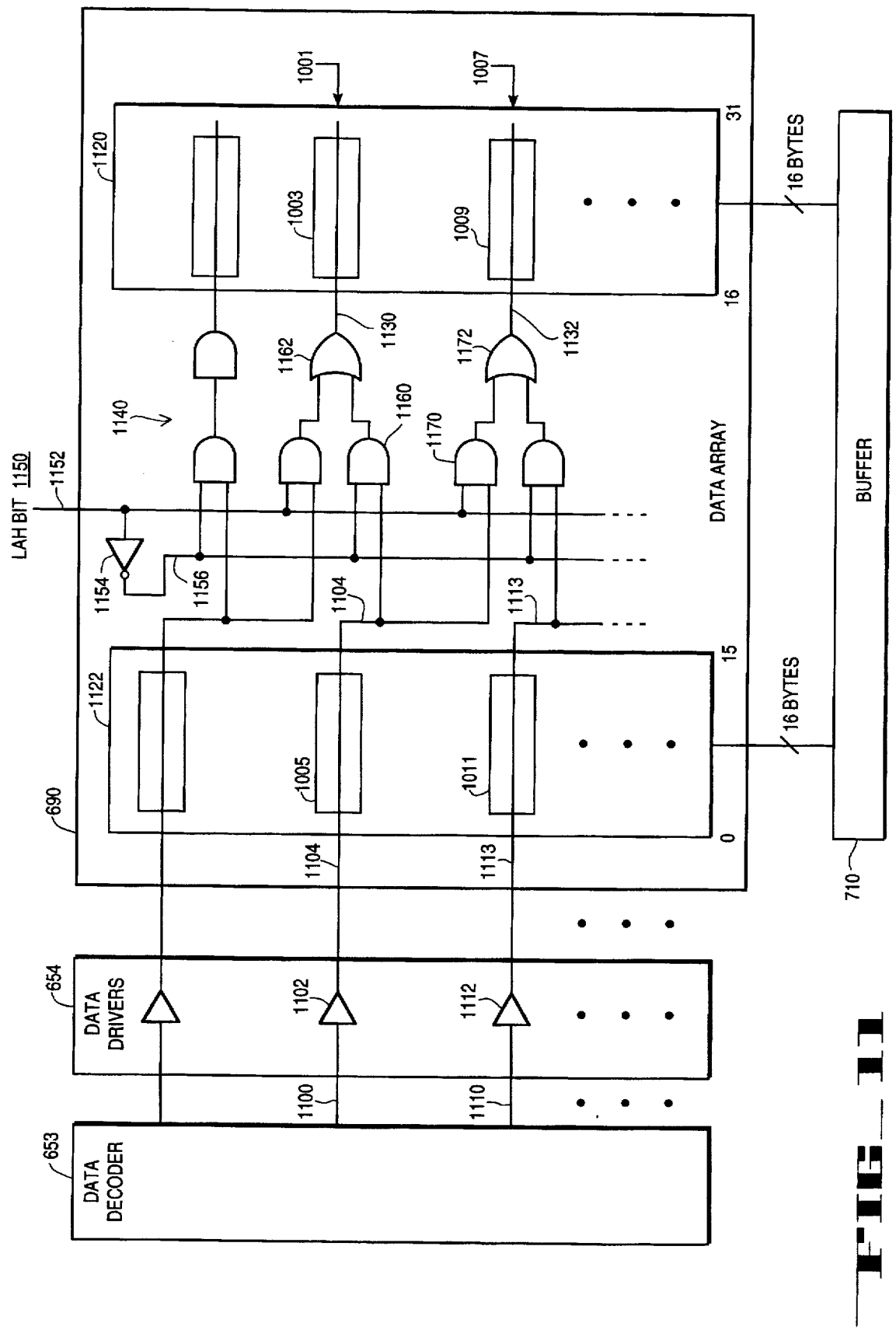
FIG. 11 is a circuit diagram of a single port core for performing a straight line or split line accesses.

Reference is now made to FIG. 11 which is a circuit diagram illustrating an implementation of a data array 690 that can perform either a straight line access or a split line access. The data decoder 653 decodes the first address 630 (FIG. 6A) to select one of 128 lines that are supplied to the data drive circuits 654. A first decoder line 1100 from the data decoder 653 is coupled to a first data driver 1102 which is coupled to a first upper wordline 1104 that selects the first upper bytes 1005 in the data array 690. A second decoder line 1110 is coupled to a second data driver 1112 that is coupled to a second upper wordline 1113 that selects the second upper bytes 1011 in the data array 690.

Each 32-byte line in the data core 690 is divided into a low half that includes bytes 0–15 and an upper half that includes bytes 16–31. The lower 16-byte hairlines are illustrated at 1120, and the upper 16-byte halflines are illustrated at 1122. Each of the data drivers 654 is directly coupled to a wordline that selects one of the upper halflines 1122. The lower 16-byte hairlines 1120 are selected by wordlines including a first lower wordline 1130 that selects the first lower bytes 1003 and a second lower wordline 1132 that selects the second lower bytes 1009. Which of the first lower wordline 1130 and the second lower wordline 1132 will be selected is dependent upon whether a straight line or a split line access is required. Split line circuitry illustrated generally at 1140 is utilized in order to select the appropriate wordline. The split line circuitry 1140 receives inputs including the wordlines from the upper halflines 1122, and an LAH bit 1150 from the first address 630. The LAH bit 1150 is the most significant bit of the byte offset field 636. If the LAH bit 1150 is "0", a straight line access will be required, but if the LAH bit is "1", then a split line access will be required.

The LAH bit 1150 is supplied on LAH line 1152. An inverter 1154 coupled to the LAH line 1152 supplies LAH' bit on LAH' line 1156. An AND gate 1160 receives inputs of the LAH' bit on the LAH' line 1156 and the first upper wordline 1104. The output of the AND gate 1160 is applied to a OR gate line driver 1162 that drives the first lower wordline 1130. An AND gate 1170 receives inputs including the LAH line 1152 and the first upper wordline 1104. The output of the AND gate 1170 is supplied to an OR gate line driver 1172 that drives the second lower wordline 1132.

When the first upper wordline 1104 is selected, the split line circuitry 1140 operates as follows: if the LAH bit 1150 is low (which corresponds to a straight line access), then the first lower word line 1130 will be selected. However, if the LAH bit 1150 is high (which corresponds to a split line access), then the second lower wordline 1132 will be selected the selected one of the first lower bytes 1003 and the second lower bytes 1009 are supplied on the output bitlines together with the first upper bytes 1005 to the 32-byte buffer 710. The split line circuitry 1140 is described further with reference to FIG. 12.

Reference is now made to FIG. 12 which is a flow chart that illustrates split line access and straight line access operations. In a box 1200, the first address 630 is received. Reference is also made to FIGS. 6A, 6B and FIG. 11 for the structure described in the operational boxes of FIG. 12.

From the box 1200, operation moves in parallel to a box 1202 in which the set select field 634 is decoded in the directory decoder 646, and to a box 1204 in which the set select field 634 is decoded in the data decoder 653. From the box 1202, operation moves to a box 1210 in which a first directory line corresponding to the decoded set field is selected. The first directory line may include a tag line in the tag array 686 and a status line the status array 688. Additionally the adjoining directory line (i.e., the sequentially following directory line) is also selected. Next, operation moves in parallel to a box 1212 and to a box 1214. In the box 1212, the tag in first directory line is compared with the tag field 632 in the directory processing circuits 700. Furthermore the validity of the data may be checked. Parity may also be checked in some embodiments. In the box 1214, identical operations occur for the adjoining directory line. Preferably, matching and other verification operations in the boxes 1212 and 1214 are performed in accordance with the following commonly assigned copending applications: Ser. No. 08/035,630, entitled "Method and Apparatus for Overlapped Timing of Cache Operations Including Reading and Writing with Parity Checking", filed on Mar. 23, 1993, and Ser. No. 08/035,740, entitled "A Circuit for Selecting a Set in a Set Associative Cache", filed on Mar. 23, 1993 which are incorporated by reference herein.

Returning to the box 1204, the decoded set field 634 is applied to a box 1220 in which the upper bytes 1005 (FIG. 11) are selected in the data array 690. Operation proceeds in parallel to a decision 1222 in which the LAH bit 1150 is checked to determine if it is low or high. If it is low, then operation moves to the box 1230 which illustrates a straight line access is required and therefore the first lower wordline 1130 is chosen to select the first lower bytes 1003. However, from the box 1222 if the LAH bit 1150 is low, then operation moves to the box 1232 which illustrates that a split line access is required, and therefore the second lower wordline 1132 is chosen to select the second lower bytes 1009.

From the boxes 1212, 1214, 1220, 1230, and 1232, operation then proceeds past a line 1236 to a decision 1240. The control circuitry that implements the decisions in the boxes following the line 1236, i.e. the boxes, 1240, 1244, 1260, and the operations in the boxes 1246, 1250, 1262, 1264 could all be included within the directory processing circuits 700. Alternately, some or all of the control circuits could be located in the selection circuit 1015.

If, in the box 1212 it had been determined that the selected tag in the first line matched the tag field 632 and the data is valid, then operation continues to box 1244. Otherwise, operation moves to the box 1246 in which the data selected in either of the boxes 1230 and 1232 is not marked usable. This information may be utilized within the selection unit 1015, which will know not to use the data. Operation then continues to the box 1248.

Returning to the decision 1244, if the adjoining line was found to match and be valid, then operation moves to the box 1250 which illustrates that the data from either the first lower bytes 1003 or the second lower bytes 1009 selected in the box 1230 or 1232 is applied to the buffer 710 and marked usable. Operation then continues in the box 1248.

However, if the adjoining line did not match or was invalid, then operation moves to a box 1260 in which use of the previously selected data depends upon whether a straight line access or a split line access is required. If a split line access is required, then operation moves to a box 1262 which illustrates that non-usable data is in the buffer 710. Then operation moves to the box 1248 to continue operations which may include, for example, fetching the requested data, or using results from another way (see FIG. 6B), if that other way's data matched and was valid. From the box 1260, if a split line access was not required (i.e. a straight line access is required) then the data from the box 1230 can be applied to the buffer 710 as illustrated in the box 1264, and operation continues as illustrated in the box 1248. One advantage of the split line access system described herein is that a split line access does not slow operation because it proceeds in parallel with directory operations. Particularly, while the directory operations including matching and validity are proceeding, the circuits necessary to determine and perform a split line access can perform their operations before the directory operations are completed. As a result, cache speed not adversely affected by a split line access, thereby increasing overall performance of the cache. When implemented in a microprocessor, the improvement in cache performance can greatly enhance overall performance of the microprocessor.

From the above description, it will be apparent that the invention disclosed herein provides a novel and advantageous multiport high speed memory circuit. The foregoing discussion discloses and describes exemplary methods and embodiments of the present invention. As will be understood by those familiar with the art, the invention may be embodied in other specific forms without departing from its spirit or essential characteristics, and thus, the described embodiment is not restrictive of the scope of the invention. The following claims are indicative of the scope of the invention. All variations which come within the meaning and range of equivalency of the claims are to be embraced within their scope.

What is claimed is:

1. A multiport high speed memory circuit including:
   a plurality of ports including a first port and a second port;
   an address means for providing a plurality of physical addresses to said plurality of ports;
   a memory array defining a plurality of memory lines for storing computer data, each memory line having a plurality of memory wordlines for accessing said memory line, said plurality of memory wordlines including a first wordline for said first port and a second wordline for said second port;
   a plurality of decoders including a decoder for each of said plurality of ports, each decoder coupled to one of said plurality of ports to receive one of the plurality of physical addresses, each of said decoders including a circuit for decoding said plurality of physical addresses to select one of a plurality of decoder output lines;
   a plurality of distributed bit comparators coupled to the outputs of the decoders, each distributed bit comparator being coupled to receive at least two of the decoder output lines associated with a single memory line, compare said decoder output lines, and supply a comparison signal to a plurality of line drivers responsive to said comparison; said plurality of line drivers including a first group of line drivers for the first port and a second group of line drivers for the second port, each line driver in said first group coupled to drive a preselected first wordline of a memory array for the first port and receiving an input line from the decoders for the first port, each line driver in said second group being coupled to drive a preselected second wordline for the second port and receiving an input line from the decoder for the second port and also receiving from the distributed bit comparators a comparison signal that, if asserted, prevents said line driver in the second group from driving its respective wordline.

2. A multiport high speed memory circuit including:
   a plurality of ports including a first port and a second port;

an address means for providing a plurality of physical addresses to said plurality of ports;

an address comparator circuit coupled to the physical address means for comparing each of said addresses to determine if there is a match between any two of said addresses, and in response thereto to provide a plurality of gate control signals;

a memory array defining a plurality of memory lines for storing computer data, each memory line having a plurality of memory wordlines for accessing said memory line, said plurality of memory wordlines including a first wordline for said first port and a second wordline for said second port;

a plurality of decoders including a decoder for each of said plurality of ports, each decoder coupled to one of said plurality of ports to receive one of the plurality of physical addresses, each of said decoders including a circuit for decoding said plurality of physical addresses to select one of a plurality of decoder output lines;

a plurality of distributed bit comparators coupled to the outputs of the decoders, each distributed bit comparator being coupled to receive at least two of the decoder output lines associated with a single memory line, compare said decoder output lines, and supply a comparison signal to a plurality of line drivers responsive to said comparison; said plurality of line drivers including a first group of line drivers for the first port and the second group of line drivers for the second port, each line driver in said first group coupled to drive a preselected first wordline of a memory array for the first port and receiving an input line from the decoders for the first port, each line driver in said second group being coupled to drive a preselected second wordline for the second port and receiving an input line from the decoder for the second port and also receiving from the distributed bit comparators a comparison signal that, if asserted, prevents said line driver in the second group from driving its respective memory line; and a gate circuit coupled to receive each of a plurality of memory lines output from the memory array, said gate circuit also coupled to receive the gate control signals, and responsive thereto, to route the data in said plurality of memory lines to a correct output line corresponding to the port that addressed said data.

\* \* \* \* \*